United States Patent [19]

Herbert et al.

[11] 3,989,860

[45] Nov. 2, 1976

[54] REPAIR TECHNIQUE FOR PHOTORECEPTORS

[75] Inventors: William G. Herbert, Webster; Paul L. Gerace, Rochester, both of N.Y.

[73] Assignee: Xerox Corporation, Stamford, Conn.

[22] Filed: July 22, 1974

[21] Appl. No.: 490,634

[52] U.S. Cl. .................................. 427/142; 427/75; 427/76; 427/355; 427/388 R; 96/1.5; 252/501

[51] Int. Cl.$^2$ ........................ B23P 7/00; B05D 5/12

[58] Field of Search ............... 117/2 R, 34; 427/140, 427/142, 76, 75, 74; 96/1.5; 252/501

[56] References Cited

UNITED STATES PATENTS

| | | | |
|---|---|---|---|
| 1,404,001 | 1/1922 | Barrett | 117/2 R |
| 2,530,738 | 11/1950 | Spessard | 117/2 R |
| 2,663,636 | 12/1953 | Middleton | 96/1.5 |
| 3,312,548 | 4/1967 | Straughan | 117/201 X |
| 3,484,237 | 12/1969 | Shattuck et al. | 96/1.5 |
| 3,684,548 | 8/1972 | Contois | 117/34 |
| 3,725,058 | 4/1973 | Hayashi et al. | 96/1.6 X |
| 3,791,826 | 2/1974 | Cherry et al. | 96/1.5 |
| 3,816,118 | 6/1974 | Byrne | 96/1.5 |

FOREIGN PATENTS OR APPLICATIONS

| | | | |
|---|---|---|---|
| 2,127,346 | 10/1972 | France | 96/1.5 |

*Primary Examiner*—Ronald H. Smith
*Assistant Examiner*—Evan K. Lawrence
*Attorney, Agent, or Firm*—James J. Ralabate; James P. O'Sullivan; Jerome L. Jeffers

[57] ABSTRACT

Disclosed is a method for repairing an electrostatographic photoreceptor comprised of a conductive substrate with a uniform layer of selenium on its surface. Scratches in the selenium layer of a depth less than its total thickness are filled with a photoconductive composite as repair material. When the combination of materials forming the composite are selected so as to provide discharge characteristics similar to those of selenium, the repaired photoreceptor will provide copies in which printout in the repaired areas is of the same quality as in the non-damaged areas.

11 Claims, No Drawings

REPAIR TECHNIQUE FOR PHOTORECEPTORS

BACKGROUND OF THE INVENTION

The process of electrostatographic copying, as originally disclosed by C. F. Carlson in U.S. Pat. No. 2,297,691, involves the uniform electrostatic charging of a layer of photoconductive material dispersed on a conductive substrate with subsequent exposure of the charged layer to a light and shadow image to selectively discharge the photoconductive layer and thereby form a latent electrostatic image on the surface of the layer corresponding to the shadow areas. The latent image is developed by contacting the layer with a particulate electroscopic marking material, commonly referred to as toner, which adheres to the non-discharged areas and can be transferred to a receiving member such as paper in imagewise configuration.

The conductive substrate and layer of photoconductive material, which normally contains a resistive barrier layer between the substrate and photoconductive material and may have a protective overcoating on the surface of the photoconductive layer, is generally referred to as the photoreceptor. Typically, the photoconductive material used in photoreceptors is amorphous selenium or an alloy thereof.

Photoreceptors are easily damagaed in field use such as by paper scratching and handling damage which may occur when the photoreceptor is installed or serviced. In addition, foreign matter such as paper clips may come into contact with the photoreceptor during the copying process and gouge the layer of photoconductive material. The damaged photoreceptor is left with depressions on its surface which reduce copy quality. In the case where the depression is deep enough so as to protrude through the photoconductive material to the conductive substrate, the damaged area cannot hold a charge and will not contribute to the formation of the latent image. Less severe scratches which do not form depressions through the entire thickness of the photoconductive layer are also problematical. Copy quality can be reduced initially since the photoconductive material remaining in the damaged area may, upon charging and imagewise exposure, have a contrast potential less than the sensitivity of the system. In addition, as the imaging and development cycle is repeated, toner particles tend to build up in the depressions since ordinary photoreceptor cleaning techniques are effective in removing toner only when it is on a relatively smooth surface. The buildup of toner particles, which are normally non-conductive, results in damaged areas retaining their charge during exposure and thereby forming part of the latent image. These areas are developed along with the rest of the latent image and ultimately show up as dark areas when the toner is transferred from the photoreceptor to the paper.

As the photoreceptor receives progressively more scratches, it reaches a point where copy quality is unacceptable whereupon it must be replaced or repaired with the latter option obviously being preferred. One method of repairing selenium based photoreceptors involves buffing the damaged areas to physically remove the depression by abrading away the photoconductive material in the scratched area down to a thickness commensurate with the total layer thickness less the depth of the depression. This repair method works well for shallow scratches, but in situations where the scratch is deep enough to cause a depression up to and greater than half the total thickness of the photoconductive layer, the amount of buffing required becomes burdensome.

Accordingly, it would be desirable and it is an object of the present invention to provide a novel method for the repair of electrostatographic photoreceptors having a layer comprising selenium dispersed on a conductive substrate and having depressions in the selenium layer.

A further object is to provide such a method which is readily adaptable for field use.

An additional object is to provide such a method which is quick, easy to use and can be practiced without special training and/or equipment.

SUMMARY OF THE INVENTION

The present invention is a method for the repair of an electrostatographic photoreceptor comprised of a conductive substrate with a uniform dispersion of selenium or a selenium alloy on its surface as the photoconductive layer in which the photoreceptor has been damaged by the formation of a depression partially through the photoconductive layer. The method involves:

a. providing a photoconductive composite which exhibits discharge propertires similar to the photoconductive layer when applied to the depression in an amount just sufficient to fill it;

b. dispersing the photoconductve composite in a solvent for the polymer to provide a flowable dispersion;

c. applying the dispersion to the depression in an amount sufficient to fill the depression and thereby form a smooth surface on the photoconductive layer; and d. drying the dispersion after its application to the depression to remove the solvent.

DETAILED DESCRIPTION

Typically, the photoreceptors which are repaired by the process of the present invention comprise selenium which has been vapor deposited under vacuum onto an aluminum drum having an insulating barrier layer of aluminum oxide on its surface. In another embodiment, the selenium is deposited on a flexible nickel belt having a resistive polymer coating on its surface as the barrier layer. As used herein, the term selenium is intended to refer to amorphous elemental selenium. Also included within the preview of this invention are selenium alloys. Examples of selenium alloys useful in photoreceptors are the selenium/arsenic alloys disclosed by Ullrich in U.S. Pat. No. 2,803,542 and the selenium/arsenic alloys doped with halogen disclosed by Straughan in U.S. Pat. No. 3,312,548.

Commerical photoreceptors of the type which can be repaired by the method of the present invention normally have a layer of selenium or selenium alloy of from 50 to 70 $\mu$ in thickness on the conductive substrate. Repair of scratches in the selenium surface has been problematical due to the difficulty of providing a material which can be applied to the damaged areas which has discharge characteristics similar to the selenium. As used herein, discharge characteristics is a term intended to refer to various characteristics of a photoconductive material such as spectral response, quantum efficiency, dark decay and dark dielectric constant. In the situation where the scratch projects through the selenium layer, a repair material having discharge characteristics essentially the same as the selenium would have to be used to provide a repaired photoconductor which would provide acceptable copy quality. Since a material's discharge characteristics will vary with its thickness, it is possible to trade off discharge characteristics against thickness of the layer when the scratch extends only part way through the selenium layer. Thus, by filling a depression in a selenium layer with a material which exhibits discharge characteristics similar to the selenium at the thickness necessary to just fill the depression, the repaired areas will exhibit discharge characteristics substantially equal to the selenium when exposed to radiation of a wavelength and intensity sufficient to discharge the selenium. It has been discovered that such a repair can be accomplished by introducing a properly selected photoconductive composite into the depression in the photoconductive layer. This is achieved by thoroughtly mixing the composite in a suitable solvent to form a flowable dispersion which is used to fill the depression. A preferred technique for applying the dispersion is simply to "paint" it on the damaged area with a soft brush. Sufficient material is applied to just fill the depression so that upon evaporation of the solvent, a smooth surface containing no bumps or depressions is provided. Any excess material should be carefully feathered out around the edges of the repaired area to avoid any substantial buildup and thereby provide a substantially smooth surface. After application of the repair material, the solvent is evaporated, optionally with gentle heating, to provide a solid patch. At this point, any excess repair material can be smoothed out by buffing and the photoreceptor returned to service.

The photoconductive composite is prepared by combining an organic binder with a photoconductive pigment as sensitizer. Depending on the specific binder and sensitizer selected as well as the relative concentrations of each constituent, the binder may be either photoconductive or a charge transport material. At low binder concentrations, an inert material may be employed. At high sensitizer concentrations, i.e. 50 weight percent and above, the composite will comprise either a charge transport material or a photoconductor as binder sensitized with a photoconductive pigment.

The photoconductive sensitizer particles are necessarily quite small in size, preferably from 0.001 to 10 microns in their longest dimension. Organic and inorganic photoconductive materials may be used as sensitizer. Suitable organic photoconductive materials include the quinacridones such as, for example:

3,10-dichloro-6,13-dihydro-guinacridone; 2,9-dimethoxy-6,13-dihydro-quinacridone; 2,9-dimethyl-6,13-dihydro-quinacridone; 4,11-dimethyl-6,13-dihydro quinacridone; 3,4,10,11-tetrachloro quinacridone; 3,4,9,11-tetrachloro quinacridone; 2,4,9,11-tetrabromo quinacridone; 1,4,8,11-tetrafluoro quinacridone; 2,4,9,11-tetramethyl quinacridone; 2,8-dichloro quinacridone; 1,2,4,8,9,11-hexachloro quinacridone; 2,4,9,11-tetramethoxy quinacridone; 2,9-di acetoxy quinacridone; 2,9-diacetyl-3,10-dimethyl quinacridone; and 2,9-dibenzoyl-3,10-dimethyl quinacridone.

In addition to the quinacridones, the following organic photoconductive materials may be employed:

4,5-diphenylimidazolidinone; 4,5-diphenylimidazolidinethione; 4,5-bis-(4'-amino-phenyl)-imidazolidinone; 1,5-cyanonaphthalene; 1,4-dicyanonaphthalene; aminophthalodinitrile; nitrophthalidinitrile; 1,2,5,6-tetraazacyclooctatetraene-(2,4,6,8); 3,4-di-(4'-methoxy-phenyl)-7,8-diphenyl-1,2,5,6-tetraazacyclooctatetraene-(-b 2,4,6,8); 3,4-di-(4'-phenoxy-phenyl)-7,8-diphenyl- 1,2,5,6-tetraazacyclooctatetraene-(2,4,6,8); 3,4,7,8-tetramethoxy-1,2,5,6-tetraaza-cyclooctatetraene-(2,4,6,8);2-mercapto- benzthiazole; 2-phenyl-4-alpha-naphthylidene-oxazolone; 2-phenyl- 4-diphenylidene-oxazolone; 2-phenyl-4-p-methoxybenzylidene-oxazolone; b-hydroxy-2-phenyl-3-(p-dimethylamino phenyl)-benzofurane; 6-hydroxy-2,3-di(p-methoxyphenyl)benzofurane; 2,3,5,6-tetra-(p-methoxyphenyl)-furo-(3,2')-benzofurane; 4-dimethylamino-benzylidene-benzhydrazide; 4-dimethylaminobenzylideneisonicotinic acid hydrazide; furfurylidene-(2)-4'-dimethylamino-benzhydrazide; 5-benzilidene-amino-acenaphthene; 3-benzylidene-amino-carbazole; (4,N,N-dimethyl amino-benzylidene)-p-N,N-dimethylaminoaniline; (2-nitro-benzylidene)-p-bromo-aniline; N,N-dimethyl-N'-(2-nitro-4-cyano-benzylidene)-p-phenylene-diamine; 2,4-diphenyl-quanazoline; 2-(4'-amino-phenyl-quinazoline; 2-phenyl-4-(4'-di-methyl-amino-phenyl)-7-methoxyquinazoline; 1,3-diphenyl-tetrahydroimidazole; 1,3-di-(4'-chlorophenyl)-tetrahydroimidazole; 1,3-diphenyl-2-4'-dimethyl amino phenyl)-tetrahydroimidazole; 1,3-di-(p-tolyl)-2-[quinolyl-(2')]-tetrahydroimidazole; 3,(4'dimethylamino-phyenyl-5-(4'-methoxy-phenyl)-6-phenyl-1,2,4-triazine; 3-pyridyl-(4')-5-(4'-dimethylamino-phenyl)-6-phenyl-1,2,4-triazine; 3-(4'-amino-phenyl)-5,6-di-phenyl-1,2,4-triazine; 2,5-bis[4'-amino-phenyl-(1')]-1,3,4-triazole; 2,5-bis[4'-N-ethyl-N-acetylamino-phenyl-(1')]-1,3,4-triazole; 1,5-diphenyl-3-methyl-pyrazoline; 1,3,4,5-tetraphenyl-pyrazoline; 1-phenyl-3(p-methoxy styryl)-5-(p-methoxy-phenyl)-pyrazoline; 1-methyl-2-(3',4'-dihydroxy-methylene-phenyl)-benzimidazole; 2-(4'-dimethylamino phenyl)-benzoxazole; 2-(4'-methoxyphenyl)-benzthiazole; 2,5-bis-[p-aminophenyl-(1)]-1,3,4-oxadiazole and 4,5-diphenyl-imidazolone.

Additional organic photoconductive materials useful in the present invention include heterocyclics, e.g. carbazole and its derivatives, oxazoles, etc.; aromatic hydrocarbons, e.g. anthracene, pyrene, etc.; aromatic nitro compounds, e.g. 2,4,7-trinitro-9-fluorenone, trinitrobenzene, etc. and certain dyes and pigments such as rhodamines, crystal violet, pyrylium salts, etc.

Useful inorganic photoconductive materials include zinc oxide, zinc sulfide, zinc-cadmium sulfide, zinc-magnesium oxide, cadmuim selenide, zinc silicate, calcium-strontium sulfide, cadmium sulfide, mercuric iodide, mercuric oxide, mercuric sulfide, indium trisulfide, gallium triselenide, arsenic disulfide, arsenic trisulfide, arsenic triselenide, antimony trisulfide, titanium dioxide, zinc titanate and selenium.

Exemplary of photoconductive polymers useful as binder materials in the present invention are the polyselenide polymers containing repeating units represented by the formula;

$$\left[ B - Se_a \right]_b$$

wherein B is selected from the group of divalent hydrocarbylene radicals and divalent heterocyclic radicals, *a* is a positive integer of at least 3 and *b* is a positive integer greater than 1. These polymers and the method for their preparation are more fully described in U.S. Pat. No. 3,671,467.

Another class of polymers which act as charge transport materials useful in the invention is made up of polymers prepared from substituted or unsubstituted vinyl carbazoles such as for example, poly(vinylcarbazole), poly(3,6-dibromo-N-vinyl-carbazole), poly(N-vinyl-3-nitrocarbazole), poly(3,b-diphenyl-vinylcarbazole) and poly(3,6-dinitrovinylcarbazole). In addition, poly(3-vinyl) and poly(2-vinyl) carbazoles and derivataives thereof can be employed.

Exemplary of photoconductive pigments which may be employed in combination with poly(vinylcarbazole) or derivatives thereof are Golden Yellow RK (brominated dibenzprenequinone), Indofast Orange (imidazole), Anthanthrone, Indofast Yellow (flavanthrone), Indofast Double Scarlet (brominated pyranthrone), Indofast Brilliant Scarlet (perylene dye), Monastral Violet R, Monastral Red, Thiofast Red, Indofast Brilliant Scarlet, Indofast Orange (halogeanated anthanthrone), Pyranthrone, Golden Yellow GK (dibenzpyrenequinone) and Pyrenequinone.

Alternatively, the carbazole polymer may be doped with a donor acceptor molecule such as trinitro-fluorenone.

Exemplary of other photoconductive polymers which may be used as the binder material are poly(vinylanthracene), poly(acenaphthylene), poly(vinyltriphenylpyrazoline) and poly(vinylpyrene).

Phthalocyanine in either the B or the X form in combination with a photoconductive insulating material as binder may be used. The X form of phthalocyanine, more fully described in U.S. Pat. No. 3,657,272, is preferred. Typical photoconductive binder materials for X-phthalocyanine include organic photoconductors (especially when these are complexed with small amounts of suitable Lewis acids). Typical of these organic photoconductors are polyvinylcarbazole; polyvinylanthracene; 4,5-diphenylimidazolidinone; 4,5-diphenylimidazolidinethione; 4,5-bis-(4′-amino-phenyl)-imidazolidinone; 1,5-cyanonaphthalene; 1,4-dicyanonaphthalene; aminophthalodnitrile; nitrophthalidinitrile; 1,2,5,6-tetraazacyclooctatetraene-(2,4,6,8); 3,4-di((4′-methoxy-phenyl)-7,8-diphenyl-1,2,5,6-tetraazacyclooctatetraene-(2,3,6,8); 3,4-di(4′-phenoxy-phenyl-7,8-diphenyl-1,2,5,6-tetraazacyclooctatetraene-(2,4,6,8); 3,4,7,8-tetramethoxy-1,2,5,6-tetraazacyclooctatetraene-(2,4,6,8); 2-mercaptobenzthiazole; 2-phenyl-4-diphenylideneoxazolone; 2-phenyl-4-p-methoxy-benzylidene-oxazolone; 6-hydroxy-2-phenyl-3-(p-dimethylamino phenyl)-benzofuran; 6-hydroxy-2,3-di (p-methosyphenyl)-benzofuran; 4-dimethylaminobenzylidene-benzhydrazide; 4-dimethylaminobenzylideneisonicotinic acid hydrazide; furfurylidene-(2)-4′-dimethylamino-benzhydrazide; 5-benzilideneaminoacenaphthene; 3-benzylidene-amino-carbazole; (4-N,N-dimethylamino-benzylidene)-p-N,N-dimethylaminoaniline; (2-nitro-benzylidene)-p-bromoaniline; N,N-dimethyl-N′-(2-nitro-4-cyano-benzylidene)-p-phenylene-diamine; 2,4-diphenylquinazoline; 2-(4′-amino-phenyl)-4-phenyl-quinazoline; 2-phenyl-4-(4′-dimethyl-amino-phenyl)-7-methoxy-quinazoline; 1,3-diphenyl-tetrahydroimidazole; 1,3-di(4′-chloro-phenyl)-tetrahydroimidazole; 1,3-diphenyl-2-4′-dimethyl amino phenyl)-tetrahydroimidazole; 1,3-di-(p-tolyl)-2-quinolyl-(2′-tetrahydroimidazole; 3-(4′-dimethylamino-phenyl)-5-(4″-Methoxyphenyl-6-phenyl-1,2,4-triazine; 3-pyridil-(4″)-5-(4″-dimethylamino-phenyl)-6-phenyl-1,2,4-triazine; 3(4′-amino-phenyl)-5,6-di-phenyl-1,2,4-triazine; 2,5-bis 4′-amino-phenyl-(1′)-1,2,4-triazole; 2,5-bis 4′-(N-ethyl-N-acetyl-amino)-phenyl-(1′)-1,3,4-triazole; 1,5-diphenyl-3-methyl-pyrazoline; 1,3,4-tetraphenyl-pyrazoline; 1-methyl-2-(3′4′-dihydroxymethylene-phenyl)-benzimidazole; 2-(4′-dimethylamino phenyl)-benzoxazole; 2-(4′-methoxyphenyl)-benzthiazole; 2,5-bis-p-aminophenyl-(1)-1,3,4-oxadiazole; 4,5-diphenylimidazolone; 3-aminocarbazole; copolymers and mixtures thereof.

As previously mentioned, at binder concentrations less than about 50 percent and more typically less than about 10 percent by weight an inert material may be used as the binder. Typical insulating binders include thermoplastic and thermoset polymers such as polyvinylchloride, polyvinylacetates, polystyrene, polystyrene-polybutadiene copolymer, polymethacrylates, polyacrylics, polyacrylonitriles, silicone resins, chlorinated rubber, epoxy resins including halogenated epoxy and phenoxy resins, phenolics, epoxy-phenolic copolymers, epoxy-urea-formaldehyde copolymers, epoxy melamine formaldehyde, polycarbonates, polyurethanes, polyamides, saturated polyesters, unsaturated polyesters cross-linked with vinyl monomers and expoxy esters, vinyl epoxy resins, tall-oil modified epoxys, and copolymers and mixtures thereof.

The binder and particulate sensitizer are combined with a solvent for the binder material and thoroughly mixed so as to form a flowable dispersion. The relative proportions of the sensitizer and binder will vary dependingg on the specific materials being employed and the nature of the photoconductive surface being prepared. In general, the weight ratio of binder to sensitizer may be 20 to 0.1 parts of binder to 1 part of sensitizer. When a mixture of poly(vinylcarbazole) and X-phthalocyanine is used as the repair material, a ratio of from 20 to 6 parts polymer to 1 part phthalocyanine is normally employed.

Suitable solvents are those organic liquids which are solvents for the polymer and are sufficiently volatile to be evaporated from the dispersion after its application to the damaged photoreceptor. Examples of solvents which can be used are toluene, chloroform, methylene chloride and preferably cyclohexanone. The amount of solvent used to prepare the dispersion is not critical and will vary depending on the physical properties of the solid constituents. Typically, a dispersion having the consistency of fingernail polish is prepared for ease of application.

A person skilled in the art who seeks to prepare a repair material for a given photoreceptor having depressions in its surface of a given depth will realize that he must conduct a few routine experiments to determine the precise ratio of a particular photoconductive particle and photoconductive polymer he must use to obtain the desired results.

The invention is further illustrated by the following examples in which all parts and percentages are by weight unless otherwise specified.

EXAMPLE I

An electrostatographic photoreceptor consisting of an aluminum cylinder, 8″ in diameter and 12″ long, with a uniform 60 $\mu$ layer on its surface of a photoconductive selenium alloy containing 0.33% As and 20 ppm chlorine, is scratched to a depth of about 20$\mu$. The photoreceptor is used in the normal xerographic mode with unsatisfactory results due to toner buildup in the depressions created by the scratches with consequent failure to discharge in these areas causing them to appear as black marks on the copies produced. The toner is removed from the scratches by use of a cotton swab wetted with isopropyl alcohol.

A flowable dispersion is prepared by combining 1 part X-phthalocyanine, 16 parts poly(vinlycarbazole) and about 85 parts cyclohexanone as solvent. Thorough mixing of the formulation results in a dispersion which is applied to the depressions with a soft brush. Care is taken during application to apply sufficient repair material to fill the depression without providing a large excess. The excess which is applied is carefully feathered out along the edges of the depression to provide an even coating having no noticeable protrusions on the photoreceptor surface. The repair material is dried at room temperature for 10 minutes to remove the solvent and provide a hard surface.

The repaired photoreceptor is employed to produce copies in the normal xerographic mode. Inspection of the copies produced discloses that the scratched areas which appeared black before repair now are undetectable. The image areas on the copies are uninterrupted since the repaired areas have discharge properties substantially equivalent to the undamaged areas of the photoreceptor.

EXAMPLE II

An endless nickel belt, 65 inches in diameter, 16½ inches wide and 4.5 mils thick having a polymeric barrier layer on its surface covered with a uniform 60 $\mu$ thick layer of a selenium alloy containing 0.33% As and 100 ppm chlorine, is scratched to provide depressions of approximately 5 $\mu$ in depth. The depressions are filled as described in Example I. Copies made in the xerographic mode after repair contain no deletions or dark marks in the scratched areas. This is contrasted with copies made before repair wherein the copy areas corresponding to the scratched portions of the photoreceptor appear as black lines.

EXAMPLE III

A flowable dispersion made up of 1 part X-phthalocyanine and 4 parts of beeswax is prepared by thoroughly mixing the components. No solvent is required due to the low viscosity of the beeswax. The composition is applied to the scratched areas of the photoreceptor described in Example I and buffed to provide a smooth surface. Copies made from the treated photoreceptor are unacceptable due to the failure of the repair material to discharge, thereby producing black marks on the copy corresponding to the repaired areas.

EXAMPLE IV

The photoreceptor described in Example I is scratched as before and the depressions treated with a mixture of 1 part X-phthalocyanine and 4 parts of a polycarbonate as binder using trichloroethane as solvent. This material is also found to be unsatisfactory for the reasons set out in Example III.

EXAMPLE V

A flowable dispersion is prepared by thoroughly mixing 1 part of 2,4,7-trinitro-9-fluorenone with 6 parts poly(vinyl-carbazole) in 96 parts cyclohexanone as solvent. The material is used to repair scratches in the photoreceptor described in Example I by the technique described therein. Copies made using the repaired photoreceptor show a significant improvement over copies made using the photoreceptor before its repair. The repaired areas are imaged along with the undamaged areas of the photoreceptor to provide an uninterrupted copy of the document being reproduced. The image areas corresponding to the repaired parts of the photoreceptor are not as clear as was the case in Example I but are quite legible.

EXAMPLE VI

A dispersion is prepared by mixing 10 parts of a particulate alloy containing 63 percent selenium and 37 percent As, 1 part poly(vinylcarbazole) and 10 parts cyclohexanone as solvent. The dispersion is applied to scratches in the photoreceptors described in Examples I and II by the technique previously described. Copies prepared from the treated photoreceptors are of the quality described in Example V.

EXAMPLE VII

A flowable dispersion is prepared by mixing 1 part of poly(N-vinylcarbazole) with 10 parts of cyclohexanone. The dispersion is applied to the damaged photoreceptors described in Examples I and II in the manner previously described. Copies prepared using the repaired photoreceptors are unacceptable for the reasons set out in Example III.

What is claimed is:

1. A method of repairing an electrostatographic photoreceptor comprising a conductive substrate with a uniform layer of selenium or an alloy thereof as photoconductive material on its surface, wherein the photoconductive layer contains a depression of a depth less than its total thickness, which method comprises the steps of:

a. providing a photoconductive composite, comprised of an organic binder with a photoconductive pigment as sensitizer, which exhibits discharge properties similar to the photoconductive layer when applied to the depression in an amount just sufficient to fill it;

b. dispersing the photoconductive composite in an organic solvent for the organic binder to provide a flowable dispersion;

c. applying the dispersion to the depression in an amount just sufficient to fill the depression and thereby form a smooth surface on the photoconductive layer with the photoconductive dispersion filling but not overlapping the depression; and d. drying the dispersion after its application to the depression to remove the solvent.

2. The method of claim 1 wherein an excess of the dispersion is applied to the depression and the excess is buffed down to the level of the uniform layer of selenium or selenium alloy after drying of the dispersion.

3. The method of claim 1 wherein the photoconductive pigment has a particle size of from 0.001 to 10 microns in its longest dimension.

4. The method of claim 1 wherein the organic binder is substituted or unsubstituted poly(vinylcarbazole).

5. The method of claim 4 wherein the organic binder is poly(vinylcarbazole), poly(3,6-dibromo-N-vinylcarbazole), poly(N-vinyl-3-nitrocarbazole), poly(3,6-diphenylvinylcarbazole) or poly(3,6-dinitrovinylcarbazole).

6. The method of claim 1 wherein the photoconductive composite is comprised of poly(vinylcarbazole) and X-phthalocyanine.

7. The method of claim 6 wherein the weight ratio of poly(vinylcarbazole) to X-phthalocyanine is from 20 to 1 to 6 to 1.

8. The method of claim 7 wherein the uniform layer is a selenium alloy containing about 0.33% on a weight basis and about 100 ppm chlorine.

9. The method of claim 1 wherein the photoconductive composite is comprised of poly(vinylcarbazole) and 2,4,7-trinitro-9-fluorenone.

10. The method of claim 1 wherein the solvent is toluene, chloroform, methylene chloride or cyclohexanone.

11. The method of claim 6 wherein the solvent is cyclohexanone.

* * * * *

UNITED STATES PATENT AND TRADEMARK OFFICE

CERTIFICATE OF CORRECTION

PATENT NO. : 3,989,860

DATED : November 2, 1976

INVENTOR(S) : William G. Herbert and Paul L. Gerace

It is certified that error appears in the above-identified patent and that said Letters Patent are hereby corrected as shown below:

Column 1, line 27, delete --damagaed-- and insert therefor "damaged".

Column 2, line 24, delete --propertires-- and insert therefor "properties".

Column 3, line 49, delete --guinacridone-- and insert therefor "quinacridone".

Column 3, line 68, delete -- -b --.

Column 4, line 6, delete -- b- -- and insert therefor "6-".

Column 4, lines 24 and 25, delete --phyenyl-- and insert therefor "phenyl".

Column 4, line 47, delete --cadmuim-- and insert therefor "cadmium".

Column 5, line 3, delete --(3, b- -- and insert therefor "(3, 6-".

Column 5, line 6, delete --derivataives-- and insert therefor "derivatives".

Column 5, line 15, delete --halogeanated-- and insert therefor "halogenated".

Column 5, line 47, delete --(p-methosyphenyl)-- and insert therefor "(p-methoxyphenyl)".

UNITED STATES PATENT AND TRADEMARK OFFICE

CERTIFICATE OF CORRECTION

PATENT NO. : 3,989,860

DATED : November 2, 1976

INVENTOR(S) : William G. Herbert and Paul L. Gerace

It is certified that error appears in the above-identified patent and that said Letters Patent are hereby corrected as shown below:

Column 6, line 22, delete --expoxy-- and insert therefor "epoxy".

Column 6, line 28, delete --dependingg-- and insert therefor "depending".

Signed and Sealed this

Twenty-second Day of February 1977

[SEAL]

*Attest:*

RUTH C. MASON
*Attesting Officer*

C. MARSHALL DANN
*Commissioner of Patents and Trademarks*